United States Patent [19]

Angeli

[11] Patent Number: 4,652,105

[45] Date of Patent: Mar. 24, 1987

[54] FRAME NUMBER COUNTER FOR DISK FILM CAMERA

[75] Inventor: Gerald J. Angeli, Spencerport, N.Y.

[73] Assignee: Eastman Kodak Company, Rochester, N.Y.

[21] Appl. No.: 856,554

[22] Filed: Apr. 28, 1986

[51] Int. Cl.$^4$ ............................................. G03B 17/36
[52] U.S. Cl. ..................................... 354/121; 354/217
[58] Field of Search ............. 354/121, 215, 217, 289.1

[56] References Cited

U.S. PATENT DOCUMENTS

| | | | |
|---|---|---|---|
| 1,570,453 | 1/1926 | Smith | 354/121 |
| 2,531,653 | 11/1950 | Tait et al. | 354/121 |
| 4,202,614 | 5/1980 | Harvey | 354/121 |
| 4,325,619 | 4/1982 | Seckendorf et al. | 354/121 |

Primary Examiner—A. A. Mathews
Attorney, Agent, or Firm—Roger A. Fields

[57] ABSTRACT

In a photographic camera adapted to receive a film cartridge containing a rotatable film disk, a film advance hub is rotated in engagement with the film disk to move successive frame areas of the disk into an exposure position for picture-taking. A plurality of frame number identifiers corresponding respectively to the frame areas of the film disk are arranged on a rear cover of the camera substantially about an opening in the rear cover. A free end portion of the film advance hub is disposed in the opening to enable a pointer element on the free end portion to indicate the frame number identifier corresponding to a frame area of the film disk in the exposure position.

3 Claims, 6 Drawing Figures

FRAME NUMBER COUNTER FOR DISK FILM CAMERA

BACKGROUND OF THE INVENTION

1. Field of the Invention

The invention relates generally to the field of photography, and more particularly to a frame number counter for counting the number of exposed frame areas on a film disk in a camera.

2. Description of the Prior Art

Cameras for use with a substantially flat cartridge containing a rotatable film disk were introduced several years ago by Eastman Kodak Company. The film disk includes a central core having a circular array of relatively small frame number imprints disposed in raised relation on the core surface. The frame number imprints are individually viewable at an opening in a rear wall of the cartridge. Typically, cameras for use with the cartridge include a plastic window in a rear door of the camera for viewing a frame number imprint at the opening in the cartridge. The window usually has an integral magnifying lens for enlarging the frame number imprint to facilitate its viewing.

While the magnifying lens generally serves its intended purpose, a number of problems are possible. For example, the magnifying lens may be come scratched with extended use of the camera, thereby making it difficult to see the frame number imprint positioned behind the window. Also, the magnifying lens significantly adds to the manufacturing cost of the camera.

SUMMARY OF THE INVENTION

The invention solves the above-described problems regarding a frame number counter in a disk film camera by providing a plurality of frame number identifiers corresponding to the frame areas of thefilm disk on a rear cover of the camera. The frame number identifiers are arranged substantially about an opening in the rear cover. A free end portion of a film advance hub which is rotatable in engagement with the film disk to move the frame areas of the disk successively into an exposure position is supported preferably in the opening in the rear cover. This enables a pointer element on the free end portion to indicate the frame number identifier corresponding to a frame area in the exposure position.

Accordingly, the invention obviates the need as in prior art cameras for a magnifying lens to view the frame number imprints on the central core of a film disk in the camera.

BRIEF DESCRIPTION OF THE DRAWINGS

The invention will be described in connection with the drawings, wherein.

DESCRIPTION OF THE PREFERRED EMBODIMENT

The invention is disclosed as being embodied preferably in a disk film camera. Because such a photographic camera is generally known, this description is directed in particular to camera elements forming part of or cooperating directly with the preferred embodiment. It is to be understood, however, that camera elements not specifically shown or described may take various forms known to persons of ordinary skill in the art.

CAMERA OPERATION

Figure 1:
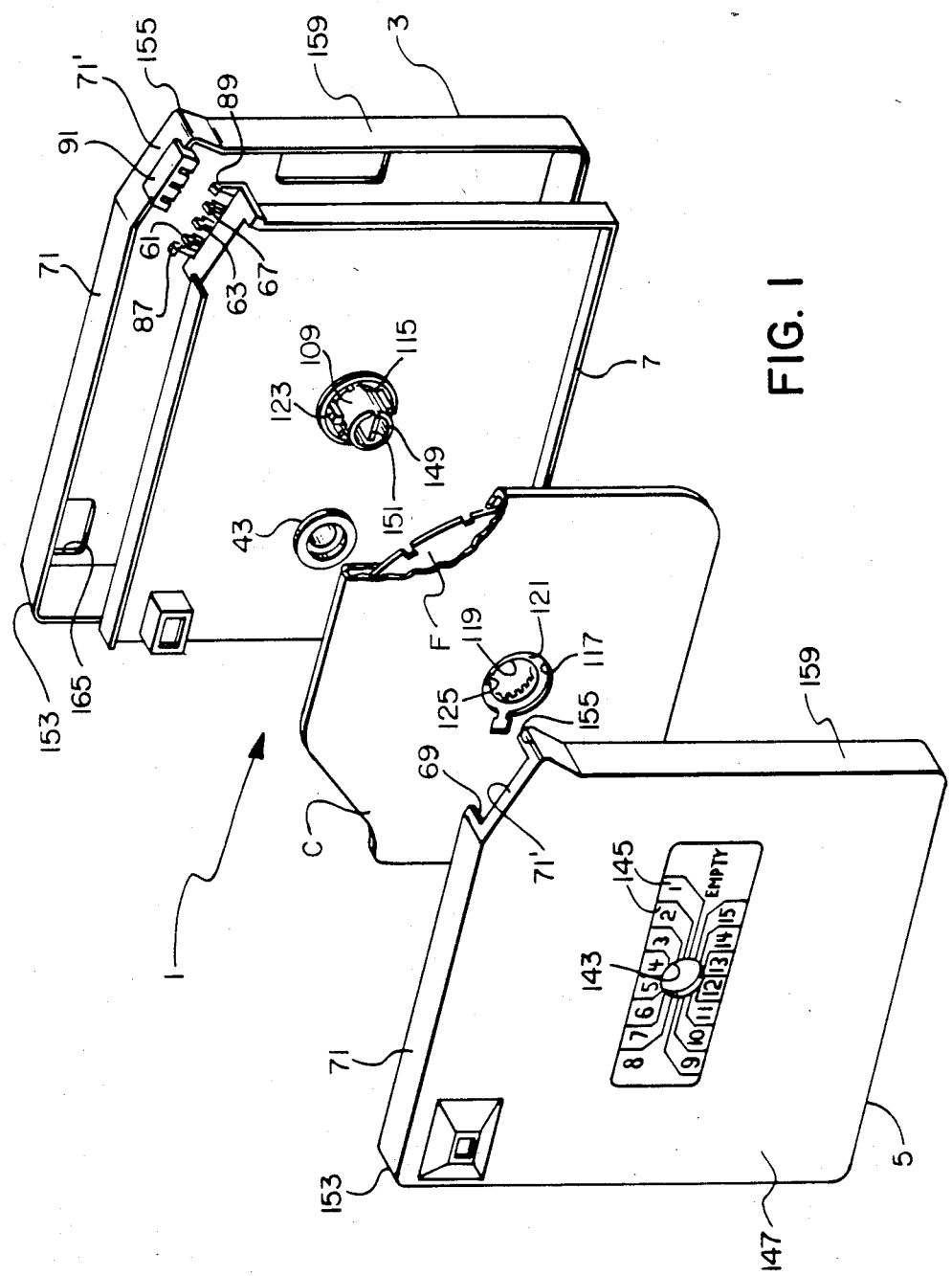
FIG. 1 is a rear exploded perspective view of a disk film camera showing a frame number counter in accordance with a preferred embodiment of the invention.

Referring now to the drawings and in particular to FIG. 1, there is shown an exploded perspective view of a disk film camera 1 having a front cover 3 and a rear cover 5 which are permanently sealed together to define the body of the camera. The connected front and rear covers 3 and 5 house a conventional disk film cartridge C, such as manufactured by Eastman Kodak Company, and a midplate 7 on which various mechanisms (to be described) are supported. The disk film camera 1 is a disposable type. That is, it can only be used with the disk film cartridge C sealed between the front and rear covers 3 and 5. Once the frame areas of the film disk F in the cartridge C are successively exposed, the camera 1 with the cartridge is given to a photofinisher. At the photofinisher, the camera 1 is broken open and the film disk F is removed from the cartridge C for processing. The finished prints are sent to the customer and the camera 1 is discarded.

The disk film camera 1 can best be understood in terms of its operation. To take a picture, a shutter release button 9 integrally formed with a release slide 11 is manually depressed to move the slide in a downward direction in FIG. 4. The release slide 11 has a pair of channels 13 and 15 on its underside which mate with respective rails 17 and 19 on a front surface 21 of the midplate 7 to permit movement of the slide in the downward direction. When the release slide 11 is moved in the downward direction, a resiliently flexible arcuate member 23 which is integrally formed with the slide and with an actuator 25 tends to straighten. This causes the actuator 25 to pivot in a counter-clockwise direction in FIG. 5 about a post 27 extending through a central opening 29 in the actuator. The actuator 25 pivots out of abutting relation with a stop 30 on the front surface 21 of the midplate 7. At the same time, a pusher 31 on the back side of the actuator 25 pivots a driver 33 in a counter-clockwise direction in FIG. 5 against the contrary urging of a schematically shown return spring 37. The driver 33, like the actuator 25, has a central opening 39 through which the post 27 extends to permit the driver to pivot about the post. Although not shown, the actuator 25 may include a lens cover which would be withdrawn from in front of a photographing objective or taking lens 41 as the actuator is pivoted in the counter-clockwise direction in FIG. 5. The taking lens 41 is supported within a cylindrical lens barrel 42 supported within an opening 43 in the midplate 47.

Figure 2:
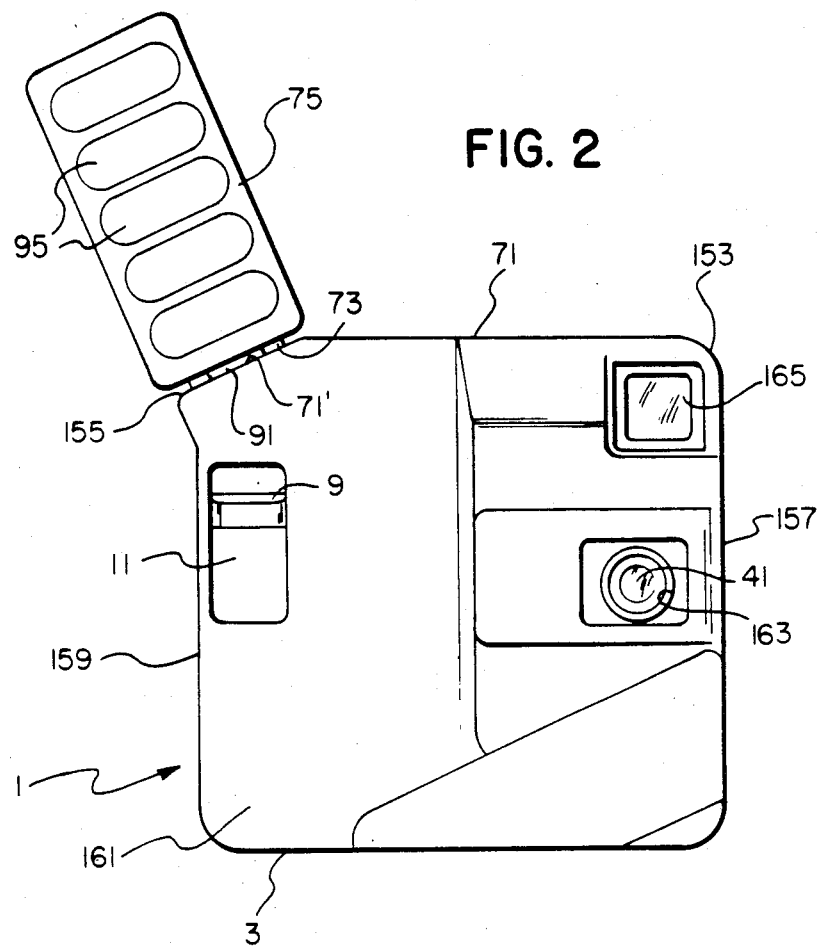
FIG. 2 is a front elevation view of the disk film camera showing an expendable flash unit supported on a flash mount.
Figure 3:
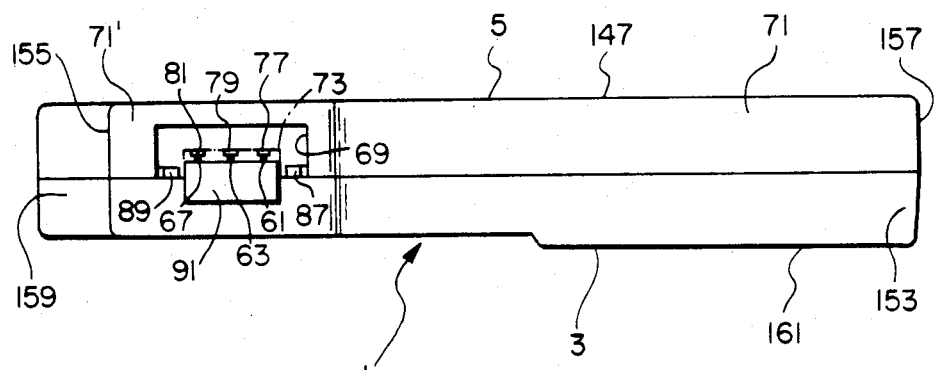
FIG. 3 is a top plan view of the disk film camera showing the manner of attaching a connector-base of the flash unit to the flash mount.
Figure 5:
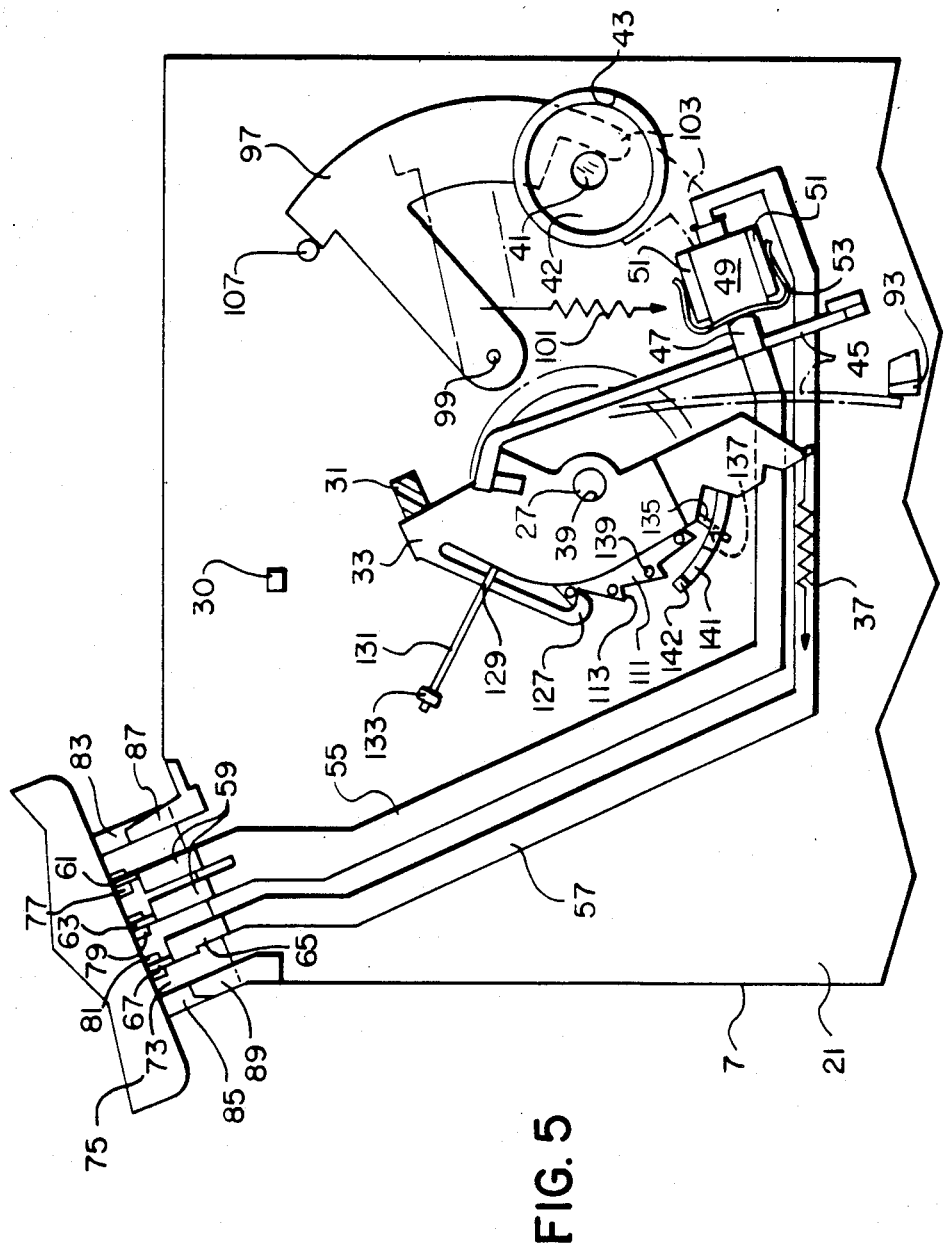
Figure 6:
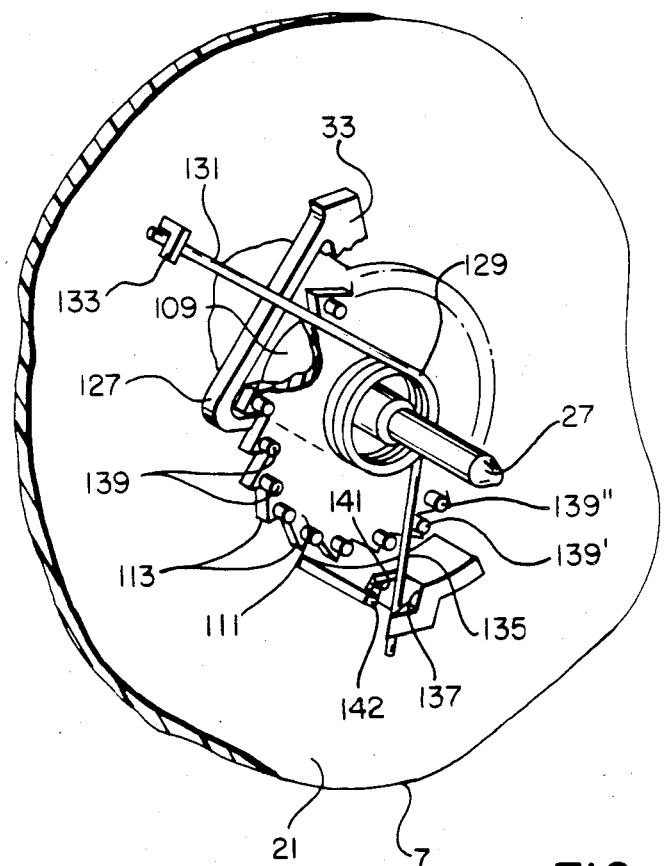
FIG. 6 is a front exploded perspective view of certain of the mechanisms depicted in FIGS. 4 and 5.

A resiliently flexible firing beam 45 integrally formed with the driver 33 includes a hammer 47 for striking one end of a piezoelectric crystal 49 to thereby produce an electrical pulse for flash firing. The piezoelectric crystal 49, as shown in FIG. 5, is secured between a pair of spaced supports 51 on the front surface 21 of the midplate 7 by a u-shaped retaining clip 53. A pair of conductive strips 55 and 57 on the front surface 21 are connected to respective ends of the piezoelectric crystal 49. The conductive strip 55 has a bifurcated stem 59 on which a pair of piezo contacts 61 and 63 are disposed at right angles to the stem. The conductive strip 57 has a non-bifurcated stem 65 on which a single piezo contact 67 is disposed at a right angle to the stem. As can be seen in FIG. 3, the connected front and rear covers 3 and 5 define an elongate opening 69 in a top surface 71 of the covers for receiving a u-shaped connector base 73 (depicted in phantom) of an expendable multi-lamp flash unit 75. The flash unit 75 is shown in FIGS. 2 and 6 and is a known one, such as manufactured by Sylvania Corp. The connector-base 73 of the flash unit 75 has three flash contacts 77, 79 and 81 which mate at the opening 69 with the respective piezo contacts 61, 63, and 67 and has a pair of engageable notched surfaces 83 and 85 which mate at the opening with corresponding engaging posts 87 and 89 on the front surface 21 of the midplate 7. The piezo contacts 61, 63 and 67 protrude slightly from the opening 69. Thus, an upstanding shield 91 is integrally formed on the top surface 71 at the front cover 3 to protect the piezo contacts in the absence of a flash unit 75. See FIGS. 1 and 3.

When the driver 33 is pivoted in the counter-clockwise direction in FIG. 5, the integral firing beam 45 is bent (as depicted in phantom) until it springs free of a retaining ramp 93 on the front surface 21 of the midplate 7. The released beam 45 in turn causes the hammer 47 to strike one end of the piezoelectric crystal 49. This produces an electrical pulse which ignites a flash bulb, not shown, behind one of the light emission windows 95 of the flash unit 75 to thereby illuminate the subject being photographed.

An impact type shutter blade 97 similar to the one shown in commonly assigned U.S. Pat. Nos. 4,183,648 and 4,565,431 is mounted for pivotal movement about a mounting pin 99 on the front surface 21 of the midplate 7. The shutter blade 97 is biased by a schematically shown return spring 101 to pivot in a clockwise direction in FIG. 4 to a closed position behind (covering) the taking lens 41. In the closed position, an impact receiving nose 103 of the shutter blade 97 is lightly held by the return spring 101 against the end of the piezoelectric crystal 49 opposite the end struck by the hammer 47. A slit (not shown) in the lens barrel 42 permits the shutter blade 97 to extend through the lens barrel crosswise to cover the taking lens 41 and to permit the nose 103 of the shutter blade to contact the piezoelectric crystal 49. When the piezoelectric crystal 49 is struck by the hammer 47, the mechanical shock to the crystal is transmitted through the crystal to the nose 103 of the shutter blade 97. The shutter blade 97 is actuated by the transmitted shock, as shown in FIG. 5, to pivot in a counter-clockwise direction from its closed position (depicted in phantom) to an opened position in which the shutter blade uncovers the taking lens 41 to initiate a film exposure in synchronization with flash firing. An arcuate rib 105 on the front surface 21 of the midplate 7 supports the shutter blade 97 during its movement between the closed and opened positions.

Although not shown, an adjustable rebound stop may be included which is movable into and out of the arcuate path of movement of the shutter blade 97. The adjustable rebound stop would be movable between the shutter blade 97 in its closed portion and a fixed rebound stop 107 on the front surface 21 of the midplate 7. When the camera 1 is used without the flash unit 75, the adjustable rebound stop would be moved into the arcuate path of the shutter blade 97 to prevent the blade from reaching the fixed rebound stop 107, thereby shortening the exposure time. Conversely, when the flash unit 75 is connected to the camera 1, the adjustable rebound stop would be removed from the arcuate path of the shutter blade 97 to permit lengthened travel of the blade to the fixed rebound stop 107, thereby increasing the exposure interval.

Figure 4:
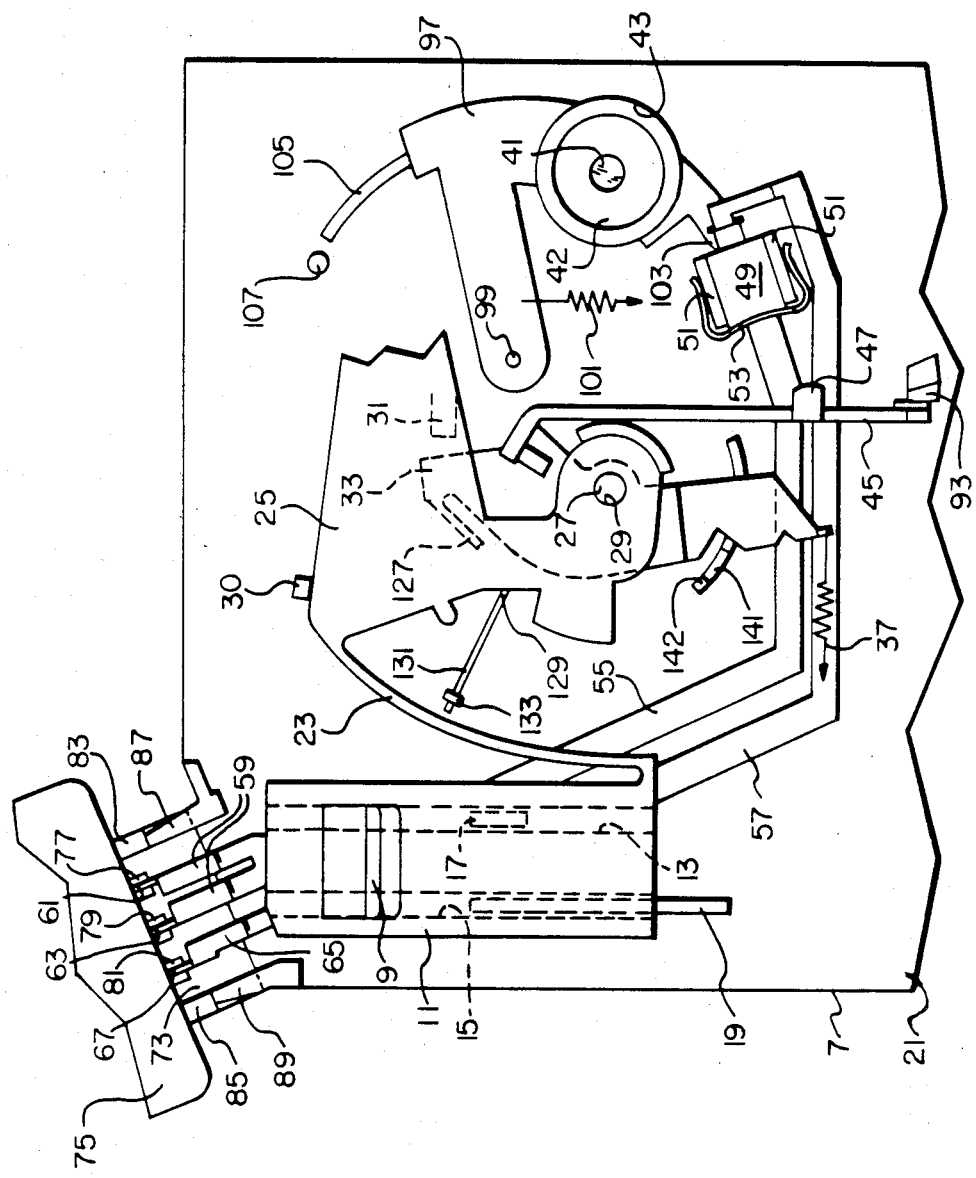
FIGS. 4 and 5 are front elevation views of various mechanisms within the camera body showing the sequence of operation of such mechanisms.

As shown in FIG. 6, the post 27 which supports the actuator 25 and the driver 27 for pivotal movement in FIGS. 4 and 5 is integrally formed with a coaxial film advance hub 109 and a coaxial ratchet wheel 111 having a plurality of peripheral teeth 113. The film advance hub 109 is seen most clearly in FIG. 1. The hub 109 projects rearwardly from a central opening 115 in the midplate 7 and extends through respective openings 117 and 119 in the disk film cartridge C and a central core 121 of the film disk F. A locking stud 123 on the hub 109 is received in a slot 125 at the opening 119 in the core 121 to rotationally engage the hub with the film disk F. When the driver 33 is pivoted in the counter-clockwise direction in FIG. 5, a pawl member 127 integrally formed with the driver separates from the last tooth 113 it engaged on the ratchet wheel 111 and drops in front of the next tooth on the ratchet wheel.

Manual release of the shutter release button 9 permits the return spring 37 to pivot the driver 33 in a clockwise direction in FIG. 5 about the post 27, thereby moving the pusher 31 on the back side of the actuator 25 to similarly pivot the actuator about the post. This causes the release slide 11 to be raised in an upward direction in FIG. 4 to its original position. When the driver 33 is moved in the clockwise direction in FIG. 5, the integral pawl member 127 similarly rotates the ratchet wheel 111 to increment the film advance hub 109 and move an unexposed frame area of the film disk F into an exposure position behind the taking lens 41. The driver 33 is halted in its clockwise movement by abutment of the actuator 25 against the stop 30. See FIG. 4.

As shown in FIGS. 5 and 6, a positioning spring 129 extends about the post 27 at a location between the ratchet wheel 111 and the driver 33. The positioning spring 129 has a longer spring leg 131 secured to a retaining member 133 on the front surface 21 of the midplate 7 and has a shorter spring leg 135 biased against a stop 137 on the front surface. The ratchet wheel 111 has a plurality of studs 139 proximate the respective peripheral teeth 113 on the ratchet wheel. When the ratchet wheel 111 is rotated in the clockwise direction in FIG. 6 by the pawl member 127 of the driver 33, a particular stud 139' which is in contact with the shorter spring leg 135 swings the shorter spring leg in the clockwise direction away from the stop 137, up a ramp 141 on the front surface 21 of the midplate 7, and towards a stop 142 at the end of the ramp. The shorter spring leg 135 is moved up the ramp 141 by the stud 139' until the leg is elevated above that stud. This permits the stud 139' to pass beneath the shorter spring leg 135; whereupon, the shorter spring leg swings in a counter-clockwise direction against the next stud 139". The shorter spring leg 135 in contact with next stud 139" very slightly rotates the ratchet wheel 111 in the counter-clockwise direction until the leg returns to the stop 137. This is done to finely position an unexposed frame area of the film disk F in the exposure position. The film frame is then held stationary in the exposure position by the opposing forces of the shorter spring leg 135 against the stud 139" and the pawl member 127 urged by the return spring 37 to engage one of the peripheral teeth 113 of the ratchet wheel 111.

FRAME NUMBER COUNTER

As shown in FIG. 1, the rear cover 5 has a central opening 143 disposed in an axial alignment with the film advance hub 109. A plurality of frame number identifiers 145 which include respective imprints of the numbers "1", "2", "3", "4", "5"... "15" are located on an exterior face 147 of the rear cover 5 in evenly spaced relation substantially about the opening 143. The frame number identifiers 145 correspond to the successive frame areas of the film disk F. The film advance hub 109 is supported with a free end portion 149 of the hub disposed loosely within the opening 143. This enables a pointer element 151 on the free end portion 149 of the hub to point out the particular frame number identifier 145 corresponding to the frame area of the film disk F in the exposure position.

FLASH POSITIONING APPARATUS

As can be seen in FIGS. 1–3, a pair of spaced top edges 153 and 155 of the connected front and rear covers 3 and 5 are formed by the juncture of the top surface 71 of such covers and respective side surfaces 157 and 159 of the covers. An exterior face 161 of the front cover 3 is shown in FIG. 2. The front cover 3 has an opening 163 for the taking lens 41 which is located farther from the top edge 155 than the top edge 153. A viewfinder window 165 is located above the opening 163 for the taking lens 41 and the top edge 155 is elevated lower than the top edge 153, whenever the connected front and rear covers 3 and 5 are positioned upright as in FIG. 2. The top surface 71 of the connected front and rear covers 3 and 5 has a portion 71' including the opening 69 for the connector-base 73 of the flash unit 75 which is inclined towards the top edge 155. As shown in FIG. 5, the piezo contacts 61, 63 and 67 and the engaging posts 87 and 89 which are disposed at the opening 69 are similarly inclined on the front surface 21 of the midplate 7. Thus, the flash unit 75 will be supported by the engaging posts 87 and 89 in an orientation above the inclined portion 71' angled away from the connected front and rear covers 3 and 5 and with the light emission windows 95 of the flash unit pointing generally in the same direction as the taking lens 41. Preferably, the flash unit 75 is sufficiently angled to extend beyond the top edge 155 farthest from the opening 163 for the taking lens 41. See FIG. 2. This arrangement effects a separation between the light emission windows 95 of the flash unit 75 and the taking lens 41 which is increased to substantially avoid red eye during picture-taking.

The invention has been described with reference to a preferred embodiment. However, it will be understood that various modifications of the invention may be effected within the ordinary skill in the art without departing from the scope of the invention.

I claim:

1. An improved photographic camera of the type adapted to receive a film cartridge containing a rotatable film disk, wherein a film advance hub is rotatable in engagement with the film disk to move successive frame areas of the disk into an exposure position, and wherein the improvement comprises:

a rear cover having an opening;

a plurality of frame number identifiers located on said rear cover substantially about said opening, said frame number identifiers corresponding respectively to the frame areas of the film disk;

an indicator element on said film advance hub; and means supporting said hub for observation of said indicator element substantially at said opening in the rear cover to enable the indicator element to point out the frame number identifier corresponding to a frame area of the film disk in the exposure position.

2. The improvement as recited in claim 1, wherein said film advance hub has a free end portion located substantially within said opening in the rear cover and said indicator element is disposed on said free end portion.

3. An improved photographic camera of the type adapted to receive a film cartridge containing a rotatable film disk, wherein a film advance hub having a free end portion is rotatable in central engagement with the film disk to move successive frame areas of the disk into an exposure position, and wherein the improvement comprises:

a rear cover having an opening disposed substantially in axial alignment with said film advance hub;

a plurality of frame number identifiers located on said rear cover in evenly spaced relation substantially about said opening, said frame number identifiers corresponding respectively to the frame areas of the film disk;

a pointer element on said free end portion of the film advance hub; and means supporting said hub with its free end portion disposed substantially in said opening in the rear cover for enabling said pointer element to point out said respective frame number identifiers in response to rotation of the hub to move the corresponding frame areas of the film disk into the exposure position.

* * * * *